United States Patent [19]

Filmer et al.

[11] Patent Number: 5,925,582

[45] Date of Patent: Jul. 20, 1999

[54] GLASS COMPOSITION SUITABLE FOR USE IN A FLUORESCENT LAMP, LAMP ENVELOPE MANUFACTURED FROM SAID GLASS COMPOSITION AND FLUORESCENT LAMP PROVIDED WITH A LAMP ENVELOPE OF SAID GLASS COMPOSITION

[75] Inventors: Bartholomeus Filmer, Lommel; Gerardus H.A.M. Van Der Steen, Eindhoven, both of Netherlands

[73] Assignee: U.S. Philips Corporation, New York, N.Y.

[21] Appl. No.: 08/854,709

[22] Filed: May 12, 1997

[30] Foreign Application Priority Data

May 13, 1996 [EP] European Pat. Off. ............ 96201313

[51] Int. Cl.$^6$ .................... C03C 3/083; C03C 3/085; C03C 3/087
[52] U.S. Cl. ................ 501/69; 501/64; 501/70; 501/72; 313/480; 313/636; 313/639; 313/493
[58] Field of Search ................ 501/64, 69, 70, 501/72; 313/110, 112, 116, 480, 636, 639, 493

[56] References Cited

U.S. PATENT DOCUMENTS

| | | | |
|---|---|---|---|
| 3,819,972 | 6/1974 | Sanner | 501/70 |
| 3,885,182 | 5/1975 | Chu | 501/66 |
| 4,521,524 | 6/1985 | Yamashita | 501/64 |
| 4,607,016 | 8/1986 | Danielson et al. | 501/70 |
| 4,666,871 | 5/1987 | Spierings et al. | 501/67 |
| 4,677,081 | 6/1987 | Thomas et al. | 501/64 |
| 5,470,805 | 11/1995 | Filmer | 501/55 |
| 5,599,754 | 2/1997 | Maeda et al. | 501/70 |
| 5,631,195 | 5/1997 | Yanagisawa et al. | 501/70 |
| 5,747,399 | 5/1998 | Kosokabe et al. | 501/66 |

*Primary Examiner*—Michael Marcheschi
*Attorney, Agent, or Firm*—Norman N. Spain

[57] ABSTRACT

A novel type of glass having a low sodium content (<0.1 wt. % $Na_2O$), which can be used as a bulb glass (10) for "TL" lamps and for compact fluorescent lamps. Said glass is free of the toxic and/or corrosive components PbO, F, $As_2O_3$ and $Sb_2O_3$. Apart from favorable properties as regards phosphor poisoning and mercury absorption, resulting in a favorable maintenance of the lamp, said glass is characterized by a wide working range W.R. ($=T_{work}-T_{soft}$), so that glass tubing can be readily made of said glass. By virtue of the low liquidus temperature ($T_{liq}$), the glass can be drawn into glass tubing which is free of crystals.

3 Claims, 1 Drawing Sheet

GLASS COMPOSITION SUITABLE FOR USE IN A FLUORESCENT LAMP, LAMP ENVELOPE MANUFACTURED FROM SAID GLASS COMPOSITION AND FLUORESCENT LAMP PROVIDED WITH A LAMP ENVELOPE OF SAID GLASS COMPOSITION

BACKGROUND OF THE INVENTION

The invention relates to a glass composition for use in a lamp envelope, which composition comprises silicon oxide, aluminum oxide, barium oxide and at least two alkali-metal oxides.

The invention also relates to a fluorescent lamp comprising a hermetically sealed, glass lamp envelope which is manufactured from such a glass composition.

The lamp envelope of fluorescent lamps is generally made of a cheap, soda-lime type of glass. The lamp envelope may be in the form of a bulb or a tube. A tubular lamp envelope may be straight or, for example, bent so as to be U-shaped or spiral-shaped. The lamp envelope may also comprise a number of parallel, straight tubes which are connected to each other by a so-called bridge. The lamp envelope also includes two so-called glass stems which enable passage of the current-supply conductors. The presence of sodium in the glass has a favorable effect on the shaping and processing of the glass as it reduces the viscosity of the glass. However, it also leads to a number of disadvantages of the lamp.

One of the disadvantages is that the maintenance of the fluorescent lamp is adversely affected by the presence of sodium in the glass. The term maintenance is to be understood to mean in this context the decrease in light output, expressed in lumen, of the lamp during operation. In an ideal case, the light output of the lamp after, for example, 5000 burning hours is equal to the light output at 0 burning hours. It is assumed that said decrease can be attributed to the fact that the phosphors (fluorescent powder) are poisoned by sodium in the glass.

Sodium present in the glass also reacts with the mercury vapor with which the lamp envelope is filled, thereby forming an amalgam. This effect is accompanied by the consumption of mercury by the lamp envelope. In addition, this effect is visible because it causes blackening or greying of the lamp envelope, so that the light transmission of such a lamp envelope is adversely affected. To counteract this adverse interaction with sodium in the glass, the inner surface of the lamp envelope may be provided with a protective coating, for example, of $Y_2O_3$. However, this requires an additional process step. In addition, during fusion-sealing, the coating disappears at the location of the bridge and at the location of the stems. It is therefore desirable to use glass having a low sodium content for the lamp envelopes of fluorescent lamps.

In U.S. Pat. No. 4,666,871 a description is given of a glass having a low sodium content for use in a fluorescent lamp. The known glass may contain 0–2 mol % (0–1.3 wt. %) of $Na_2O$. However, this known glass has a number of shortcomings.

According to the examples, this known glass comprises large quantities (approximately 30 wt. %) of BaO, which is an expensive raw material. In addition, this component leads to an increase of the liquidus temperature ($T_{liq}$) and hence to a considerable increase of the crystallization tendency of the glass.

Another important drawback of the known glass is that it is difficult to manufacture glass tubing and lamp envelopes from this glass because it has a narrow working range (W.R.) and its high $T_{liq}$. W.R. is to be understood to mean the difference between the working temperature ($T_{work}$) and the softening temperature ($T_{soft}$) of the glass. To manufacture glass tubing and lamp envelopes a wide W.R. of at least 300° C. is desirable. The W.R. of the known glass is much narrower, as will be explained hereinbelow.

The known glass may comprise up to 5 mol % of PbO. A disadvantage of the use of PbO is its toxicity. In the preparation of lead glass, PbO is released into the atmosphere by atomization and evaporation, which is harmful to the environment and the operators. PbO is also released when lead glass is subjected to a hot working operation, such as bending, shaping and fusion-sealing. Other disadvantages of PbO are the high price of the raw material and the decrease of the light output of fluorescent lamps, which is brought about by evaporation and, subsequently, condensation of PbO on the fluorescent powder during hot working of the lead-containing glass tubing.

SUMMARY OF THE INVENTION

It is an object of the invention to provide, inter alia, a glass composition which can be used in a lamp envelope, which glass composition is free of sodium or has a very low sodium content and does not have the above-mentioned drawbacks. It must be possible to melt the glass in existing furnaces and the glass must be readily processable to form, inter alia, glass tubing and, subsequently, lamp envelopes. The glass must also be free of PbO and other volatile, toxic or corrosive components such as $Sb_2O_3$, $As_2O_3$ and F. Unlike the known glass, the glass in accordance with the invention is preferably free of $B_2O_3$ and $ZrO_2$. $B_2O_3$ is disadvantageous because it is expensive and aggressive relative to the refractory material of the glass furnace. $ZrO_2$ adversely affects the fusibility of the glass. The physical properties should match those of the customarily used sodium-containing glasses.

The invention also aims at providing a mercury-vapor fluorescent lamp comprising a lamp envelope, in particular a tubular lamp envelope, which is made of such a glass composition, the lamp having a light output which, during operation of the lamp, has a good maintenance; i.e. the light output decreases little with time.

In accordance with the invention, these objects are achieved by a glass composition which, expressed as a percentage by weight, comprises the following constituents:

| | | | |
|---|---|---|---|
| $SiO_2$ | 55 | — | 70 |
| $Al_2O_3$ | 2 | — | 6 |
| $Li_2O$ | 0.5 | — | 4 |
| $Na_2O$ | | <0.1 | |
| $K_2O$ | 10 | — | 15 |
| MgO | 0 | — | 3 |
| CaO | 0 | — | 4 |
| SrO | 4 | — | 7 |
| BaO | 7 | — | 10 |
| $CeO_2$ | 0 | — | 0.5 |

Said glass has a low sodium content and favorable fusion and processing properties, which will be described hereinbelow. The glass composition is very suitable for drawing glass tubing and for use as a lamp envelope in a fluorescent lamp, in particular a tubular lamp envelope for a compact fluorescent lamp (CFL), in which the wall load is higher than in a "TL" lamp (normal straight tubular fluorescent lamp) owing to the smaller diameter of the lamp envelope. The glass can also suitably be used to manufacture bulb-shaped lamp envelopes for fluorescent lamps, such as QL lamps. The glass can also suitably be used to manufacture other parts of the lamp envelope, such as stems. The absence, or near absence, of $Na_2O$ from the glass of the lamp envelope leads to a lower mercury consumption of the lamp. As a result, the quantity of mercury added to the fluorescent lamp can be smaller than in lamps comprising the customary sodium-containing lamp envelopes; this has a substantial, advantageous effect on the environment.

This glass composition does not comprise the above-mentioned detrimental components PbO, F, $As_2O_3$ and $Sb_2O_3$. The content of the expensive BaO is relatively small.

The $SiO_2$ content of the glass in accordance with the invention is limited to 55–70 wt. %. In combination with the other constituents, said $SiO_2$ content leads to a readily fusible glass. $SiO_2$ serves as a network former. If the $SiO_2$ content is below 55 wt. %, the cohesion of the glass and the chemical resistance are reduced. An $SiO_2$ content above 70 wt. % hampers the vitrification process, causes the viscosity to become too high and increases the risk of surface crystallization.

$Al_2O_3$ improves the chemical resistance and the resistance against weathering of the glass. Below 2 wt. %, the effect is too small and the crystallization tendency of the glass increases. Above 6 wt. %, the viscosity and the softening temperature ($T_{soft}$) of the glass increase excessively, which adversely affects the processability of the glass.

The alkali metal oxides $Li_2O$ and $K_2O$ are used as a fluxing agent and lead to a reduction of the viscosity of the glass. If both alkali metal oxides are used in the above composition, then the mixed-alkali effect causes the electrical resistance to be increased and $T_{liq}$ to be reduced. In addition, predominantly the alkali metal oxides determine the expansion coefficient α of the glass. This is important because it must be possible to fuse the glass to the stem glass and/or the current supply conductors, for example, of copper-plated iron/nickel wire in such a way that the glass is free from stress. If the alkali-metal-oxide content is below the indicated limits, the glass will have a too low α value and $T_{soft}$ will be too high. Above the indicated limits, the α-value will be too high. $Li_2O$ causes a greater reduction of $T_{soft}$ than $K_2O$, which is desirable to obtain a wide W.R. (=$T_{work}$−$T_{soft}$). Too high an $Li_2O$ content leads to an excessive increase of $T_{liq}$. In addition, $Li_2O$ is an expensive component, so that, also from an economical point of view, the $Li_2O$ content is limited.

The glass composition comprises maximally 0.1 wt. % $Na_2O$. A higher $Na_2O$ content leads to a reduction of the maintenance of the fluorescent lamp and to an increase in mercury absorption.

BaO has the favorable property that it causes the electrical resistance of the glass to increase and $T_{soft}$ to decrease. Below 7 wt. %, the melting temperature ($T_{melt}$), $T_{soft}$ and the working temperature ($T_{work}$) increase too much. Above 10 wt. %, the liquidus temperature ($T_{liq}$) and hence the crystallization tendency increase too much.

The alkaline earth metal oxides SrO, MgO and CaO have the favorable property that they lead to a reduction of $T_{melt}$. By combining said three alkaline earth metals with BaO, a minimum value of $T_{liq}$ is achieved. Below 4 wt. % SrO, $T_{liq}$ increases excessively.

Above the indicated limits, $T_{soft}$ and $T_{liq}$ increase excessively. The glass in accordance with the invention has a favorable $T_{liq}$ (approximately 920° C.) and hence hardly tends towards crystallization during the manufacture of the glass and during drawing glass tubing from said glass. By virtue of a wide W.R. of at least 300° C. and a low $T_{soft}$ (<700° C.) the glass can be shaped into a tube without any problems by means of, for example, the Danner process.

The glass composition in accordance with the invention can be refined by means of $BaSO_4$, so that the glass may contain up to 0.2 wt. % $SO_3$. The glass may additionally contain an impurity in the form of, maximally, 0.05 wt. % $Fe_2O_3$, which originates from the raw materials used.

If necessary, up to 0.5 wt. % $CeO_2$ is added to the glass to absorb undesirable UV radiation.

It is noted that in U.S. Pat. No. 5,470,805, a description is given of a glass composition for a lamp envelope of a fluorescent lamp, which glass composition comprises, however, 5–9 wt. % $Na_2O$. To attain a satisfactory maintenance of the lamp and a suppressed mercury absorption, the inner surface of the lamp envelope must be provided with a protective coating, for example, of $Y_2O_3$. In the case of a glass composition in accordance with the invention, such a coating and hence an additional process step, are redundant.

DETAILED DESCRIPTION OF THE INVENTION

Figure 1:
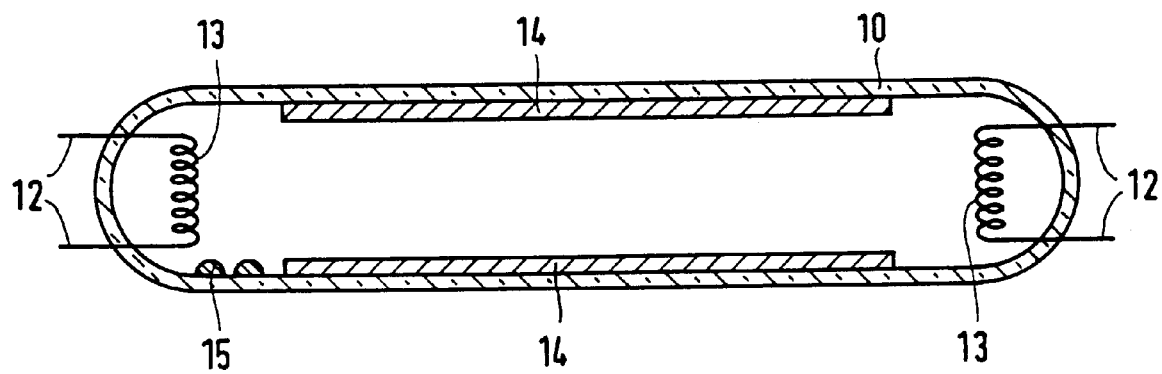
FIG. 1 is a schematic, sectional view of a fluorescent lamp.

The invention will be described in greater detail with reference to the figures of the drawings and the embodiment that follows.

A glass composition in accordance with the invention, indicated in the second column of the following Table, is melted. The melting operation is carried out in a platinum crucible in a gas-fired furnace at 1450° C. For the starting materials use is made of quartz sand, spodumene ($Li_2O.Al_2O_3.4SiO_2$), dolomite ($CaCO_3.MgCO_3$) and the carbonates of Li, K, Sr and Ba. For the refining agent use is made of $BaSO_4$. During melting and further processing no particular problems occur. For comparison, the Table also shows an example of a glass having a low sodium content in accordance with U.S. Pat. No. 4,666,871.

TABLE

| | composition in wt. % | |
|---|---|---|
| constituents | glass in accordance with the invention | glass in accordance with U.S. Pat. No. 4,666,871 |
| $SiO_2$ | 62.8 | 32.0 |
| $Al_2O_3$ | 4.0 | 6.4 |
| $Li_2O$ | 2.8 | 0.9 |
| $Na_2O$ | 0.05 | 0.02 |
| $K_2O$ | 12.7 | 5.9 |
| MgO | 1.4 | 5.1 |
| CaO | 2.0 | 7.1 |
| SrO | 5.0 | 0.4 |
| BaO | 9.0 | 29.0 |
| $SO_3$ | 0.15 | 0.04 |
| $B_2O_3$ | — | 4.4 |
| $ZrO_2$ | — | 7.8 |
| $Sb_2O_3$ | — | 0.4 |
| $Fe_2O_3$ | 0.03 | 0.02 |
| $CeO_2$ | 0.1 | 0.5 |
| $10^6 \cdot \alpha_{25-300}$ | 9.2 | 8.8 |
| $T_{strain}$ (° C.) | 487 | 582 |

TABLE-continued

| constituents | composition in wt. % | |
| --- | --- | --- |
| | glass in accordance with the invention | glass in accordance with U.S. Pat. No. 4,666,871 |
| $T_{ann}$ (° C.) | 518 | 613 |
| $T_{soft}$ (° C.) | 692 | 785 |
| $T_{work}$ (° C.) | 1008 | 969 |
| $T_{melt}$ (° C.) | 1446 | 1195 |
| $T_{k100}$ (° C.) | 368 | 523 |
| $T_{rho}$ (° C.) | 471 | — |
| $\log(rho)_{250}$ | 10.4 | — |
| $\log(rho)_{350}$ | 8.3 | — |
| $T_{liq}$ (° C.) | 920 | >1200 |
| s.m. (kg/dm$^3$) | 2.62 | 3.34 |
| W.R. (° C.) | 316 | 184 |

| | |
| --- | --- |
| $\alpha_{25-300}$: | average coefficient of expansion between 25° C. and 300° C. |
| $T_{strain}$ (° C.): | temperature at which η (viscosity) = $10^{14.5}$ dPa.s, termed strain point. |
| $T_{ann}$ (° C.): | temperature at which η = $10^{13.0}$ dPa.s, termed annealing point. |
| $T_{soft}$ (° C.): | temperature at which η = $10^{7.6}$ dPa.s, termed softening point. |
| $T_{work}$ (° C.): | temperature at which η = $10^{4.0}$ dPa.s, termed working temperature. |
| $T_{melt}$ (° C.): | temperature at which η = $10^{2.0}$ dPa.s, termed melting point. |
| rho (ohm · cm): | specific resistance. |
| $T_{k100}$ (° C.): | temperature at which rho = $10^8$ ohm · cm. |
| $T_{rho}$ (° C.): | temperature at which rho = $10^{6.52}$ ohm · cm. |
| $\log(rho)_{250}$: | logarithm to the base 10 of rho at 250° C. |
| $\log(rho)_{350}$: | logarithm to the base 10 of rho at 350° C. |
| $T_{liq}$ (° C.): | temperature above which the glass no longer crystallizes. |
| s.m. (kg/dm$^3$): | specific mass. |
| W.R. (° C.): | Working Range = $T_{word} - T_{soft}$ |

The glass composition in accordance with the invention has a low sodium content, a low $T_{liq}$ and a wide W.R. Said low $T_{liq}$ enables the glass to be drawn into tubes which are free of crystals. The wide W.R. and the low $T_{soft}$ have a favorable effect on the shaping process, for example the Danner process.

FIG. 1 is a schematic sectional view of a fluorescent lamp comprising a tubular lamp envelope 10 which is circular in section and which is made of a glass having a composition in accordance with the invention. Current-supply wires 12 which are connected to incandescent coils 13 are provided so as to pass through the walls of the lamp envelope 10. A layer of a fluorescent powder (phosphors) 14 is provided on the inner surface of the lamp envelope 10. Metallic mercury 15, which evaporates after ignition of the lamp, is present within the lamp envelope 10. Before such a lamp is sealed off, it is filled with argon having a pressure of 730 Pa.

The light output of the lamp (in lumen) after 1000 burning hours has decreased by only 2% relative to the light output at the beginning of the operating period (0 hours). After 5000 burning hours, the light output has decreased by 10%. Therefore, the maintenance of the lamp is similar to that of a lamp having an internal $Y_2O_3$ coating.

Figure 2:
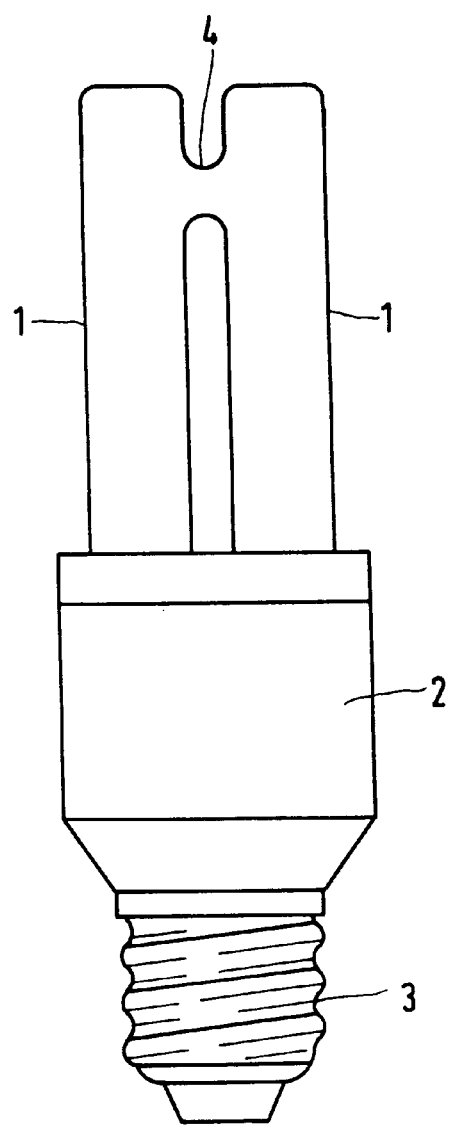
FIG. 2 is an elevational view of a compact fluorescent lamp.

FIG. 2 is an elevational view of a compact fluorescent lamp. The lamp is composed of four thin parallel lamp envelopes 1 (only two of which are shown in the drawing) which are made of a glass having a composition in accordance with the invention. The lamp envelopes are connected to each other by a bridge 4. The lamp also comprises a lamp base 2 for accommodating electronic circuitry and a threaded lampholder 3 which is to be installed in a luminaire and through which the mains voltage is supplied. Due to the substantial wall load, the use of a glass having a low sodium content in this type of lamp is particularly advantageous.

The glass in accordance with the invention is (substantially) free of $Na_2O$. By employing this type of glass in a lamp envelope for a fluorescent lamp, poisoning of phosphors by sodium is precluded. In addition, amalgam-formation is counteracted. Both effects lead to an improved maintenance of the lamp, i.e. the light output of the lamp during operation decreases only slowly with time. The use of this type of glass also leads to a lower mercury consumption of the lamp. As a result, the quantity of mercury added to the fluorescent lamp can be smaller than the quantity added to lamps comprising the customary sodium-containing lamp envelopes; this has substantial advantageous effect on the environment. The use of such a glass having a low sodium content in a fluorescent lamp causes an internal protective coating, for example, of $Y_2O_3$ to be redundant. An additional advantage of the glass is that it has a wide W.R., a low $T_{soft}$ and a favorable $T_{liq}$, so that the glass can be drawn into glass tubing without any problems.

We claim:

1. A fluorescent lamp envelope manufactured from a glass composition wherein the glass composition is free of PbO, $B_2O_3$ and $ZrO_2$ and comprises, expressed as a percentage by weight, the following constituents:

| | | | |
| --- | --- | --- | --- |
| $SiO_2$ | 55 | — | 70 |
| $Al_2O_3$ | 2 | — | 6 |
| $Li_2O$ | 0.5 | — | 4 |
| $Na_2O$ | | <0.1 | |
| $K_2O$ | 10 | — | 15 |
| MgO | 0 | — | 3 |
| CaO | 0 | — | 4 |
| SrO | 4 | — | 7 |
| BaO | 7 | — | 10 |
| $CeO_2$ | 0 | — | 0.5. |

2. A lamp envelope as claimed in claim 1, wherein the lamp envelope is tubular.

3. A fluorescent lamp comprising a hermetically sealed, glass lamp envelope, which accommodates electrodes which are connected to current-supply wires and between which a discharge takes place during operation of the lamp, said lamp envelope being filled with a gaseous atmosphere and mercury or a mercury alloy which, during operation of the lamp, evaporates at least partly, and a layer being provided on the inner surface of the wall of the lamp envelope, which layer comprises at least one phosphor, wherein the lamp envelope comprises the composition as claimed in claim 1.

* * * * *